United States Patent Office 3,170,933
Patented Feb. 23, 1965

---

3,170,933
2-(γ-METHOXYPROPYL-AMINOMETHYL)-1,4-BENZODIOXANE
Günther Schmidt, Biberach (Riss), Germany, assignor, by mesne assignments, to Boehringer Ingelheim G.m.b.H., Ingelheim (Rhine), Germany, a corporation of Germany
No Drawing. Filed Jan. 28, 1963, Ser. No. 254,438
1 Claim. (Cl. 260—340.3)

This is a continuation-in-part of copending application Serial No. 66,400, filed November 1, 1960, now abandoned which in turn is a continuation-in-part of application Serial No. 779,861, filed December 12, 1958, now abandoned.

This invention relates to 2-substituted 1,4-benzodioxanes, and more particularly to compounds of the formula

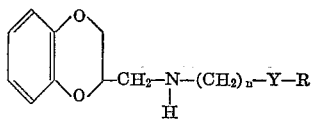

(I)

wherein:

R is hydrogen or alkyl of 1 to 4 carbon atoms,
Y is oxygen or sulfur, and
$n$ is an integer from 3 to 4, inclusive, and their non-toxic, pharmacologically acceptable acid addition salts.

Compounds having the above general structural formula may be obtained by various processes, but the following methods are most suitable:

METHOD A

By subjecting a 2-halomethyl-1,4-benzodioxane of the formula

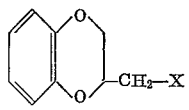

(II)

wherein X is chlorine or bormine, to a condensation reaction with a primary amine of the formula $$H_2N-(CH_2)_n-Y-R \qquad (III)$$

wherein $n$, Y and R have the same meanings as in Formula I, at temperatures above 70° C. For the purpose of neutralizing in situ the hydrogen chloride or hydrogen bromide liberated by the reaction, it is advantageous to provide a molar excess of the primary amine of the Formula III in the condensation reaction mixture. The condensation also can be carried out in the presence of an inert liquid solvent, such as xylene, toluene and the like. If an inert solvent is used, the condensation reaction is preferably carried out at the boiling point of the particular solvent. In those instances where no inert solvent is used the reaction is carried out at an elevated temperature, such as between 100 and 200° C., and preferably in a closed vessel. The isolation of the desired reaction products from the reaction mass is most advantageously accomplished by first making the reaction mass alkaline and thereafter subjecting it to distillation. This particular method of producing compounds having Formula I above is especially suitable for those cases where the aminoethers of the Formula III, i.e., wherein R is alkyl of 1 to 4 carbon atoms, or the amino-alcohols of the Formula III, i.e. wherein R is hydrogen, are readily accessible for use as starting materials.

METHOD B

By subjecting a 2-aminomethyl-1,4-benzodioxane of the formula

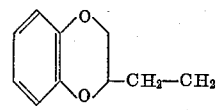

(IV)

to a condensation reaction with a halogenated compound of the formula $$Hal-(CH_2)_n-Y-R \qquad (V)$$

In Formulas IV and V, R, Y and $n$ have the same meaning as in Formula I and Hal represents chlorine, bromine or iodine. This particular method of producing the 2-substituted 1,4-benzodioxanes according to the present invention is especially advantageous in those cases where the amines of Formula III are relatively difficultly accessible, but the halogenated alcohols, thiols, thioethers or ethers of Formula V are readily accessible.

If it is desired to produce compounds of the Formula I wherein R has the meanings indicated above except hydrogen, the following methods may also be employed:

METHOD C

By alkylation of a compound of the formula

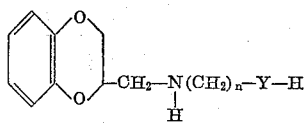

(VI)

wherein $n$ and Y have the same meanings as in Formula I. The alkylation is effected by first transforming the compound of Formula VI into the corresponding alkali metal compound, for example by heating compound VI with an alkali metal amide, preferably sodium amide, in the presence of an inert solvent, such as absolute xylene. The alkali metal compound thus obtained is then reacted with a molar equivalent of an alkylhalide of the formula Hal—R, wherein R is alkyl of 1 to 4 carbon atoms and Hal is chlorine, bromine, or iodine.

METHOD D

By transforming a compound of the Formula VIa below into the corresponding halo-compound, preferably the chloro-compound of the Formula VII below, and reacting this halo-compound with an alkali metal compound of the Formula VIII below. The reactions involved in this method proceed in accordance with the following equation:

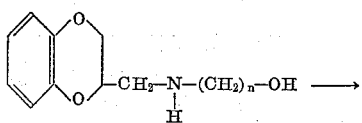

(VIa)

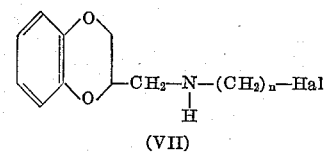

(VII)

VII + Me—Y—R ⟶
(VIII)

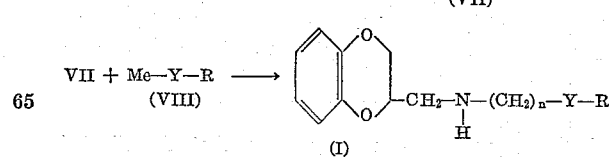

(I)

In Formulas VII and VIII n and Y have the meanings defined in connection with Formula I, Hal represents chlorine, bromine or iodine, Me is an alkali metal and R is alkyl of 1 to 4 carbon atoms, but not hydrogen. The transformation of VIa into VII may be effected by reacting VIa with a thionylhalide in the presence of an inert solvent, such as chloroform. The reaction of VII with VIII to form I is then advantageously carried out in the presence of an inert solvent, preferably absolute ethyl alcohol, and at the boiling point of the particular inert solvent employed.

The compounds of the Formula VI used as starting materials in Methods C and D may, of course, be produced in accordance with Methods A and B, i.e., by condensing compounds of Formula II with a primary amine of Formula III, R being hydrogen, or by condensing compounds of Formula IV with halogenated compounds of Formula V, R being hydrogen.

The following examples of the preparation of various representative compounds will further illustrate the present invention and enable others skilled in the art to understand it more completely. It is understood, however, that the invention is not limited to the particular compounds and methods described in these examples.

EXAMPLE I

Production of 2-(methoxy-propylaminomethyl)-1,4-benzodioxane by Method A (a) 220.8 gm. (1.2 mols) 2-chloromethyl-1,4-benzodioxane and 213.6 gm. (2.4 mols) 3-methoxypropylamine-(1) were heated in a closed tube for 15 hours at 130° C. Thereafter, the tube and its contents were allowed to cool, the contents were removed, made alkaline with sodium hydroxide and extracted with ether. The ether extract solution was dried with a dessicating agent, such as calcium chloride, and then distilled in vacuo. After the preliminary fraction consisting of 3-methoxypropylamine-(1), the desired reaction product passed over at 134° C. and at a pressure of 0.05 mm. Hg. The yield was about 80% of theory. Analysis showed that the product had the structural formula

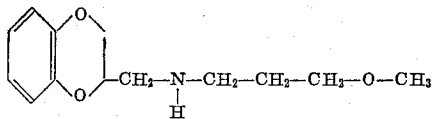

the empirical formula $C_{13}H_{19}NO_3$ and a molecular weight of 237.3.

Calculated: basic N=5.90%
Found: basic N=5.92%

The hydrochloride addition salt of this compound was obtained by treatment of the base with an ethereal hydrochloric acid solution. After recrystallization from ethylacetate, the addition salt melted at 178–180° C.

Calculated: C=57.04%; H=7.36%; N=5.12%; Cl=12.95%
Found: C=56.80%; H=7.54%; N=5.18%; Cl=12.92%

(b) 18.4 gm. (0.1 mol) 2-chloromethyl-1,4-benzodioxane and 17.8 gm. (0.2 mol) 3-methoxypropylamine-(1) were refluxed for 17 hours in the presence of 50 ml. absolute xylene as an inert solvent. The resulting reaction mixture was allowed to cool and was then extracted with dilute hydrochloric acid. The acid extraction solution was made alkaline with sodium hydroxide and was then extracted with ether. The ether extract solution was distilled in vacuo. The yield was about 45% of theory. The structural and empirical formulas and the analytical values of the reaction product were the same as those given under (a) above.

EXAMPLE II

Using a procedure analogous to that described in Example I, 2-(hydroxybutylaminomethyl)-1,4-benzodioxane was produced from 2-chloromethyl-1,4-benzodioxane and 4-hydroxybutylamine-(1). The reaction product of the formula

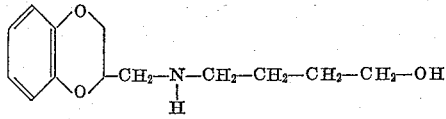

was obtained with a yield of 12.5% of theory. The analytical values of the compound were as follows:

Empirical formula: $C_{13}H_{19}NO_3$
Molecular weight: 237.3
Boiling point at 10 mm. Hg: 238–242° C.
Basic nitrogen content:
  Calculated—5.90%
  Found—5.93%

EXAMPLE III

Using a procedure analogous to that described in Example I, 2-(isopropoxypropylaminomethyl)-1,4-benzodioxane was produced from 2-chloromethyl-1,4-benzodioxane and 3-isopropoxypropylamine-(1). The reaction product of the formula

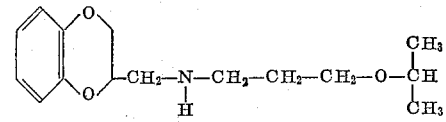

was obtained with a yield of 39% of theory. The analytical values of the compound were as follows:

Empirical formula: $C_{15}H_{23}NO_3$
Molecular weight: 265.4
Boiling point at 12 mm. Hg: 200–202° C.
Basic nitrogen content:
  Calculated—5.28%
  Found—5.30%

The hydrochloride of this compound had a melting point of 199–201° C.
Chlorine content: Calculated—11.74%. Found—11.70%.

EXAMPLE IV

Production of 2-(butoxypropylaminomethyl)-1,4-benzodioxane by Method C:

11.2 gm. (0.05 mole) 2-(hydroxypropylaminomethyl)-1,4-benzodioxane (M.P. at 0.5 mm. Hg=183–185° C.) were dissolved in 50 ml. absolute xylene and 2.1 gm. sodium amide (10% excess) were added to the resulting solution. The reaction mass was then heated and refluxed until the evolution of ammonia ceased, which required about 1.5 hours. 6.8 gm. (0.05 mol) n-butyl-bromide were then added dropwise. The mixture was again heated and refluxed for 15 minutes. Thereafter, it was allowed to cool and was extracted with dilute hydrochloric acid. The acid aqueous phase was decanted, made alkaline with sodium hydroxide and extracted with ether. The ether extract solution was distilled in vacuo. The reaction product of the formula

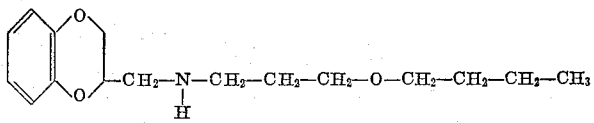

was obtained with a yield of 78.5%. Its analytical values were as follows:

Empirical formula: $C_{16}H_{25}NO_3$
Molecular weight: 279.4
Boiling point at 10 mm. Hg: 212–214° C.
Basic nitrogen content:
  Calculated—5.01%
  Found—5.36%

The hydrochloride, produced by treatment of the basic compound with an ethereal hydrochloric acid solution, had a melting point of 146–148° C.

Chlorine content: Calculated—11.22%. Found—11.23%.

EXAMPLE V

Using a procedure analogous to that described in Example IV, 2-(ethoxypropylaminomethyl)-1,4-benzo-dioxane was produced from 2-(hydroxypropylaminomethyl)-1,4-benzodioxane, sodium amide, and ethyliodide. The reaction product of the formula

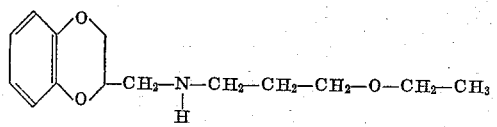

was obtained with a yield of 55%. Its analytical values were as follows:

Empirical formula: $C_{14}H_{21}NO_3$
Molecular weight: 251.3.
Boiling point at 10 mm. Hg: 210–213° C.
Basic nitrogen content:
  Calculated—5.57%
  Found—5.63%

EXAMPLE VI

*Production of 2-(methoxybutylaminomethyl)-1,4-benzo-dioxane by Method B*

16.5 gm. (0.1 mol) 2-(aminomethyl)-1,4-benzodioxane and 6.1 gm. (0.05 mol) 4-methoxybutylchloride-(1) were heated at 150° C. for 15 hours in a closed tube. Thereafter, the tube and its contents were allowed to cool. The reaction mass thereby solidified and was made alkaline with sodium hydroxide. An oily substance separated out, which was extracted with ether. The ether extract solution was distilled in vacuo. The reaction product of the formula

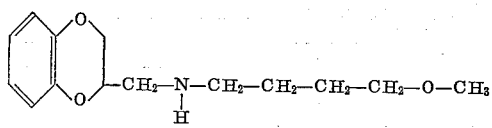

was obtained with a yield of 16% of theory. Its analytical values were as follows:

Empirical formula: $C_{14}H_{21}NO_3$
Molecular weight: 251.3
Boiling point at 10 mm. Hg: 208–212° C.
Basic nitrogen content:
  Calculated—5.57%
  Found—5.54%

The hydrochloride, obtained by treating the basic compound with an ethereal hydrochloric acid solution, had a melting point of 190–193° C. after recrystallization from ethyl acetate.

Chlorine content: Calculated—12.32%. Found—12.47%.

EXAMPLE VII

Using a procedure analogous to that described in Example I, 2-(methylmercaptobutylaminomethyl)-1,4-benzodioxane was produced from 2-chloromethyl-1,4-benzodioxane and 4-methyl-mercapto-butylamine-(1). The reaction product of the formula

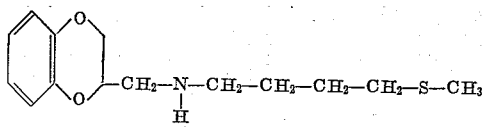

was obtained with a yield of 37.5% of theory. The analytical values of the compound were as follows:

Empirical formula: $C_{14}H_{21}NO_2S$
Molecular weight: 267.4
Boiling point at 10 mm. Hg: 234–236° C.
Basic nitrogen content:
  Calculated—5.23%
  Found—5.07%

The hydrochloride of this compound had a melting point of 207–209° C.

Chlorine content: Calculated—11.67%. Found—11.51%.

EXAMPLE VIII

*Production of 2-(methylmercaptopropylaminomethyl)-1,4-benzo-dioxane by Method D*

4.8 gm. (0.02 mol) 2-(chloropropylaminomethyl)-1,4-benzodioxane, obtained from its hydrochloride (M.P.—164–166° C.) by neutralization with sodium hydroxide, and 1.4 gm. (0.02 mol) sodium-methylmercaptide were dissolved in 100 cc. absolute ethanol, and the solution was heated and refluxed for two hours. Thereafter, the reaction mixture was allowed to cool and the sodium chloride which had separated out was filtered off. The filtrate was evaporated and the residue was dissolved in ether. Finally, the ether solution was distilled in vacuo. The desired reaction product of the formula

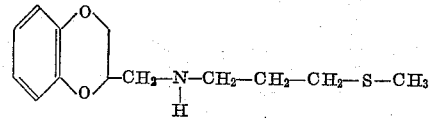

was obtained with a yield of 79% of theory. Its analytical values were as follows:

Empirical formula: $C_{13}H_{19}NO_2S$
Molecular weight: 253.4
Boiling point at 0.1 mm. Hg: 165–168° C.
Basic nitrogen content:
  Calculated—5.53%
  Found—5.45%

The hydrochloride, produced by treatment of the basic compound with an ethereal solution of hydrochloric acid, had a melting point of 192–195° C.

Chlorine content: Calculated—12.23%. Found—12.07%.

EXAMPLE IX

Using a procedure analogous to that described in Example VIII, 2-(ethylmercaptopropylaminomethyl)-1,4-benzodioxane was produced from 2-(chloropropylaminomethyl)-1,4-benzodioxane and sodium ethylmercaptide. The reaction product of the formula

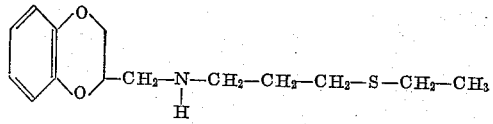

was obtained with a yield of 69% of theory. Its analytical values were as follows:

Empirical formula: $C_{14}H_{21}NO_2S$
Molecular weight: 267.4
Boiling point at 0.4 mm. Hg: 159–160° C.
Basic nitrogen content:
  Calculated—5.24%
  Found—5.23%

EXAMPLE X

Using a procedure analogous to that described in Example VIII, 2-(n-butylmercaptopropylaminomethyl)-1,4-benzodioxane was produced from 2-(chloropropylaminomethyl)-1,4-benzodioxane and sodium n-butylmercaptide. The reaction product of the formula

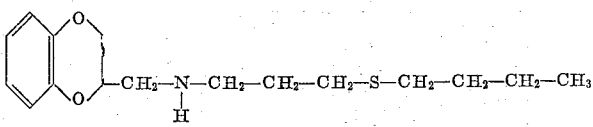

was obtained with a yield of 74% of theory. Its analytical values were as follows:

Empirical formula: $C_{16}H_{25}NO_2S$
Molecular weight: 295.4
Boiling point at 0.4 mm. Hg: 187–189° C.
Basic nitrogen content:
    Calculated—4.74%
    Found—4.70%

EXAMPLE XI

*Poduction of 2-(mercaptopropylaminomethyl)-1-4-benzodioxane by Method D*

12.0 gm. (0.05 mol) 2-(chloropropylaminomethyl)-1,4-benzodioxane, liberated from its hydrochloride with the aid of sodium hydroxide, and 3.6 gm. potassium sulfhydrate were dissolved in 80 cc. absolute ethanol and the solution was heated and refluxed for two hours. Thereafter, the reaction mixture was allowed to cool and the potassium chloride which had separated out was filtered off. The filtrate was evaporated in vacuo, the residue was dissolved in absolute ether, and the resulting solution was admixed with an ethereal solution of hydrochloric acid. The precipitate formed thereby was recrystallized from a mixture of 3 parts by volume ethylacetate and 5 parts by volume ethanol. The reaction product of the formula

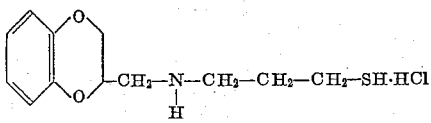

was obtained with a yield of about 30% of theory. Its analytical values were as follows:

Empirical formula: $C_{12}H_{17}NO_2S \cdot HCl$
Molecular weight: 275.8
Melting point: 212–215° C.
Chlorine content:
    Calculated—12.85%
    Found—13.13%

The 2-substituted 1,4-benzodioxanes according to the present invention have useful pharmacodynamic properties. More particularly, they produce a strong tranquilizing effect with long effective duration, even at low dosages, as evidenced by substantial prolongation of hexobarbital hypnosis in rabbits. In order to produce this important pharmacological effect the compounds herein disclosed may be administered perorally or parenterally, preferably in the form of their non-toxic, pharmacologically acceptable acid addition salts, such as their hydrochlorides, hydrobromides, acetates, tartrates, citrates, 8-chloroetheophyllinates, and so forth. In the form of such acid addition salts these compounds are sufficiently water-soluble and exhibit a very low toxicity, both parenterally and perorally.

The point of application of their pharmacodynamic activity is situated in the central nervous system, because they not only block the arousal reaction in the electroencephalogram but also reduce multisynaptic and monosynaptic reflexes of the spinal cord, such as they occur in apoplexy, multiple sclerosis and other such neurological disorders, as evidenced by complete suppression of artificially induced crossed extensor reflex tremors in anesthetized cats. In addition, the compounds of the invention exhibit a considerable adrenolytic activity and in anesthetized animals a blood-pressure-reducing effect.

Thus, the compounds according to the present invention possess properties which are different in kind from those of known homologs and analogs, because the homologs and analogs neither suppress crossed extensor reflex tremors nor prolong hexobarbital hypnosis.

For pharmacological application the compounds according to the present invention may be administered in the form of dosage unit compositions, such as tablets, coated pills, injectable solutions or suppositories, consisting essentially of an inert, physiologically compatible carrier having a single dose of one or more of the compounds of the invention distributed therethrough, a single dose being 2–80 mgm., preferably 5–20 mgm.

The following are typical examples of dosage unit compositions comprising compounds of the present invention as the active ingredient:

TABLETS

Each tablet contains:

|  | Mgm. |
|---|---|
| 2 - (γ - methoxypropyl - aminomethyl) - 1,4 - benzodioxane hydrochloride | 10.0 |
| Powdered lactose | 125.0 |
| Dry potato starch | 40.0 |
| Soluble starch | 5.0 |
| Corn starch | 38.0 |
| Magnesium stearate | 2.0 |
| Total weight of each tablet | 220.0 |

COATED PILLS

The above tablets are provided with a coating consisting essentially of sugar and talcum in the customary manner and the coated tablets are polished with the aid of beeswax. Total weight of each coated pill—330 mgm.

AMPULES

Each 2 cc. ampule contains:

| | | |
|---|---|---|
| 2 - (γ - methoxypropyl - aminomethyl) - 1,4 - benzodioxane hydrochloride | mgm | 5.0 |
| Sodium chloride | mgm | 17.0 |
| Double-distilled water, q.s.ad | cc | 2 |

SUPPOSITORIES

Each suppository contains:

|  | Mgm. |
|---|---|
| 2 - (γ - methoxypropyl - aminomethyl) - 1,4-benzodioxane hydrochloride | 40.0 |
| Suppository base | 1660.0 |
| Total weight | 1700.0 |

Of course, any other compound embraced by Formula I above or a non-toxic acid addition salt thereof may be substituted for the 2-substituted 1,4-benzodioxane compound used as the active ingredient in the above dosage-form compositions. Moreover, it is obvious that the quantities of the various ingredients in those dosage-form compositions may be varied to suit the particular situation.

While I have illustrated the present invention with the aid of certain specific embodiments thereof, it will be readily apparent to those skilled in the art that the invention is not limited to these embodiments, and that various changes and modifications may be made without departing from the spirit of the invention or the scope of the appended claim.

I claim:

A compound selected from the group consisting of 2-(γ-methoxypropyl-aminomethyl)-1,4-benzodioxane and its non-toxic, pharmacologically acceptable acid addition salts.

(References on following page)

References Cited by the Examiner

UNITED STATES PATENTS

| | | | |
|---|---|---|---|
| 2,551,013 | 5/51 | Kerwin | 260—340.3 |
| 2,662,892 | 12/53 | Johnson | 260—340.3 |
| 2,789,985 | 4/57 | Harrison | 260—340.3 |
| 2,854,379 | 9/58 | Fancher | 167—65 |
| 2,872,374 | 2/59 | Beiler et al. | 167—65 |
| 2,922,744 | 1/60 | Mills et al. | 260—340.3 |

FOREIGN PATENTS 565,573  11/44  Great Britain.

OTHER REFERENCES

Banziger et al.: "J. Am. Pharm. Assoc.," vol. 44, pages 302–5 (1955).

IRVING MARCUS, *Primary Examiner.*

NICHOLAS S. RIZZO, WALTER A. MODANCE,
*Examiners.*

UNITED STATES PATENT OFFICE
CERTIFICATE OF CORRECTION

Patent No. 3,170,933                      February 23, 1965

Günther Schmidt

It is hereby certified that error appears in the above numbered patent requiring correction and that the said Letters Patent should read as corrected below.

Column 1, line 41, for "bormine" read -- bromine --; column 2, lines 4 to 8, the formula "(IV)" should appear as shown below instead of as in the patent:

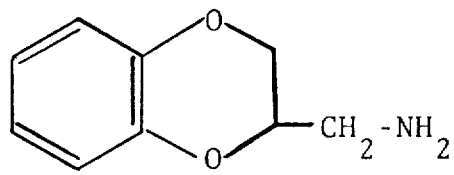

same column 2, lines 26 to 31, formula "(VI)" should appear as shown below instead of as in the patent:

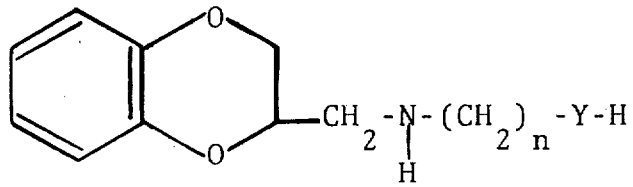

column 7, lines 62 and 63, for "8-chloroetheophyllinates" read -- 8-chlorotheophyllinates --.

Signed and sealed this 3rd day of August 1965.

(SEAL)
Attest:

ERNEST W. SWIDER                      EDWARD J. BRENNER
Attesting Officer                   Commissioner of Patents